2,827,368
NON-BURNING PLANT FERTILIZER

Everett N. Mortenson, Chicago, and Joseph P. Kealy, Lansing, Ill., assignors to Swift & Company, Chicago, Ill., a corporation of Illinois No Drawing. Application June 1, 1954
Serial No. 433,820

17 Claims. (Cl. 71—29)

This invention relates generally to fertilizer materials suitable for use on growing plants. More particularly, the invention relates to chemical fertilizers which provide liberal quantities of nitrogen, potassium and phosphorous and which have little or no "burn" or plasmolysis effect on leafy plants.

In fertilizer parlance, complete goods are those having substantial amounts of N, P and K per unit weight of fertilizer. Salts such as superphosphates, potassium chloride and ammonium sulfate together with anhydrous ammonia and certain nitrogen solutions generally serve as sources of the various elements.

As is well recognized, a good complete fertilizer represents a compromise between two desiderata; on the one hand low cost, and on the other high N, P and K levels. In particular, a problem to which attention has been directed is that of finding a low cost nitrogen source which supplies adequate amounts of this constituent. The substitution of organic N-sources for chemical sources serves to increase the cost of the product significantly and also fails to satisfy the second criterion of a good mixed fertilizer, namely, high N content. Furthermore, the only one of these organic N-sources which is economically practical is the dried residue obtained by treating domestic sewage by the "activated sludge" process. The use of this product in mixed goods is not desirable since it produces goods with an offensive odor and unattractive color. "Activated sludge" is described in detail in the Official and Tentative Methods of Analysis of the Association of Official Agricultural Chemists (AOAC), 6th ed., 1945, page 895. "Activated sludge" is not a chemical sludge product, but one derived from a process whereby sewage is treated in an aerobic fashion, i. e., with a surplus of oxygen. During the course of transforming ordinary sewage into activated sludge, the former is freed from grit and coarse solids and, in addition to being aerated as mentioned previously, is inoculated with microorganisms from previously aerated sewage. The resulting flocculated organic matter is withdrawn from the tanks, filtered, dried and ground. It is considered a desirable product for fertilizer use since it contains up to twice as much available nitrogen, that is, between five and six percent as against two to three percent nitrogen in dried ordinary sewage sludge.

For the reasons set out above, chemical sources of N, P and K are generally relied upon. In this manner, it is possible to secure formulations having virtually any ratio of the desired constituents. However, it has been observed that largely chemical fertilizers possess one particularly objectionable feature. When they are broadcast on growing leafy plants there occurs what is known as a plasmolysis effect or "burn." So as to avoid this, the manufacturer generally directs the user to thoroughly water in a chemical fertilizer immediately after it is applied to the plant. Failure to heed these instructions results in a rapid fading of the plant leaves to a lifeless brown. Consequently, chemical fertilizers have been unpopular with many. As the "burn" is particularly pronounced when such fertilizers are applied to turf, householders often prefer to use the low grade organic fertilizers in spite of their unappealing appearance, limited effectiveness, and generally higher costs per unit available plant food ingredients in such products.

It is therefore an object of this invention to provide a largely chemical fertilizer having no "burn" effect on leafy plants, particularly turf.

A further object of this invention is to provide a plant food containing at least 3% by weight or more of each of the elements nitrogen, phosphorous and potassium calculated as N, $P_2O_5$ and $K_2O$ in their available state and in such a form as to have little or no tendency to "burn" green, leafy plants. The term "available" elements or plant food constituents means those elements which are in a chemical form capable of being assimilated by growing plants or easily converted into such form during the growing season.

Additional objects and advantages, if not specifically set out will become apparent during the course of the disclosure below.

This invention is the result of the discovery that the tendency of any given salt to "burn" plant leaves can be correlated with the effect of such salt on the vapor pressure of water. Whether or not a salt will "burn" plant leaves can be readily predicted by simply forming a saturated solution of the particular salt and comparing the vapor pressure of the solution with that of pure water. If the vapor pressure of the solution, as measured on an isoteniscope, is not below a certain level, it can safely be said that the salt will not cause an objectionable plasmolysis effect when applied to leafy plants.

More specifically, this invention deals with the fact that certain chemical fertilizers "burn" plant leaves, grass in particular, because of an apparent drawing of the moisture from the plant leaves. That is, certain chemicals or combination of chemicals apparently cause plasmolysis or "burn" because they are more prone than others to draw moisture from plant leaves. It has been found that those chemicals or combination of chemicals that exhibit in solution vapor pressures substantially lower than the vapor pressures of plant cell solutions are the ones that cause plasmolysis. This invention contemplates a careful selection of ingredients whereby to formulate high analysis mixed goods which have virtually no deleterious effect when sprinkled on growing leafy plants.

A saturated aqueous solution of the salt under consideration is prepared and the vapor pressure determined by the use of an isoteniscope. Similarly, the vapor pressure of pure water at the same temperature is determined. It is then easy to decide whether the material is suitable as a non-burning fertilizer additive. If the vapor pressure is lowered to less than 85%, or preferably 87%, of that of pure water, plasmolysis will result. Compositions having vapor pressure values less than 85% of that of pure water show plasmolysis effects from moderate at just below the 85% level to severe at 80% or lower.

Table I below shows the vapor pressures of a number of common fertilizer components. The relationship of the vapor pressure of the saturated salt solution to that of pure water at the same temperature (relative humidity equilibrium values) together with the observed effect on foot square plots of turf is given in each case. The salts were evenly distributed in powdered form on dew moistened turf so as to insure adherence to the leaves and formation of saturated salt solutions. The vapor pressure of pure water at the temperature selected (122° F.) is 92.51 in mm. Hg, determined, as were the other vapor pressures set out, by the isoteniscope procedure of Adams and Merz, Ind. and Eng. Chem., 21, pp. 305–307 (1929).

It should be noted that in testing the different salts set forth in the table, the basis for determining the individual relative humidity equilibrium values was 122° F. It has been determined that in the normal use of fertilizer made in accordance with the teachings of the present invention that varying temperature conditions will effect the relative humidity equilibrium values. As the temperature increases, the values have a tendency to decrease slightly for most salts. In determining which salts are suitable in the production of a non-burning fertilizer, the basis for the determination has been set at a temperature high enough to include all normal temperature conditions which would be encountered. For example, it would be very unusual to encounter a temperature of 122° F. or higher in normal use of fertilizers. By determining which salts are suitable at this relatively high temperature, anyone practicing this invention can be satisfied that those salts which show suitable relative humidity equilibrium values at 122° F. will not cause any undesirable effects in use under normal temperature conditions. Normally, the temperatures encountered in the use of fertilizer will fall within the range of 60–120° F. On this basis, it can readily be seen that those salts having suitable values at 122° F. will clearly have suitable values at a temperature between 60–120° F. considering that the salts normally exhibit higher values at lower temperatures. It should be borne in mind, however, that the salts set forth in Table I are only representative of the type of salt suitable for use in accordance with the teachings of the present invention. Any salt which contains proper nutritive value for plant food growth and exhibits a suitable relative humidity equilibrium value under normal conditions of use may be satisfactorily utilized. For example, under controlled temperature conditions in the instance where special plants are being grown in greenhouses and the like, it is quite possible to use mixtures of salts as a fertilizer which might not be suitable for all weather conditions. On this same basis, different salts may be mixed to form fertilizers suitable for particular temperature conditions which prevail in different sections of the country. It is quite possible to form a mixture which may be suitable for use in cooler climates which may not be completely suitable for use in a warmer climate. Therefore, the general conditions of use may be taken into consideration in the selecting of suitable components. As a result, it is quite possible to formulate a relatively inexpensive fertilizer where the conditions of use are ideal.

*Table I*

| Plant food ingredient | Chemical formula | Vapor pressure of saturated aqueous soln., mm. Hg at 122° F. | Percent relative humidity in equilibrium with sat. aqueous soln., at 122° F. | Plasmolysis effect on grass |
|---|---|---|---|---|
| Magnesium ammonium phosphate | $MgNH_4PO_4.6H_2O$ | 91.5 | 99.2 | No burn. |
| Gypsum | $CaSO_4.2H_2O$ | 92.3 | 99.6 | Do. |
| Dicalcium phosphate | $CAHPO_4.2H_2O$ | 91.2 | 98.5 | Do. |
| Potassium sulfate | $K_2SO_4$ | 88.6 | 95.8 | Do. |
| Monocalcium phosphate | $Ca(H_2PO_4)_2.H_2O$ | 87.5 | 94.6 | Do. |
| Soybean meal (solvent extracted) | | 85.9 | 92.7 | Do. |
| Digester tankage | | 85.5 | 92.4 | Do. |
| Cottonseed meal (hydraulically pressed) | | 85.5 | 92.4 | Do. |
| Urea-formaldehyde condensation product | Approximately $2CO(NH_2)_2$ to $1CH_2O$ | 85.0 | 92.0 | Do. |
| Monoammonium phosphate | $NH_4H_2PO_4$ | 81.6 | 88.2 | Do. |
| Potassium nitrate | $KNO_3$ | 78.6 | 85.0 | Do. |
| Single superphosphate | | 81.9 | 88.5 | Do. |
| Ammoniated single superphosphate | 3 lbs. $NH_3$/unit APA | 81.3 | 87.9 | Do. |
| | 5 lbs. $NH_3$/unit APA | 72.6 | 78.5 | 20% burn. |
| Triple superphosphate | | 80.0 | 86.5 | 30% burn. |
| Ammoniated triple superphosphate | 3 lbs. $NH_3$/unit APA | 79.6 | 86.1 | Slight tip burn. |
| | 4 lbs. $NH_3$/unit APA | 71.1 | 76.8 | 20% burn. |
| | 5.5 lbs. $NH_3$/unit APA | 72.0 | 77.6 | 30% burn. |
| Diammonium phosphate | $(NH_4)_2HPO_4$ | 81.8 | 88.4 | Severe burn. |
| Potassium chloride | $KCl$ | 74.0 | 80.0 | Do. |
| Ammonium sulfate | $(NH_4)_2SO_4$ | 71.9 | 77.8 | Do. |
| Sodium chloride | $NaCl$ | 68.6 | 74.1 | Very severe burn. |
| Urea | $CO(NH_2)_2$ | 57.8 | 62.5 | Do. |
| Sodium nitrate | $NaNO_3$ | 62.9 | 67.5 | Do. |
| Ammonium nitrate | $NH_4NO_3$ | 44.8 | 48.4 | Severe burn. |
| Calcium nitrate | $CaNO_3.4H_2O$ | (¹) | | Very severe burn. |

¹ Melts at 108.5° F.

In Table I mention is made in connection with ammoniated single and triple superphosphate of various amounts of ammonia per unit $P_2O_5$. A unit of plant food as defined in the Official and Tentative Methods of Analysis, page 901, 6th ed., 1945, published by the Association of Official Agricultural Chemists (AOAC), is 20 pounds of plant food or 1% of a ton. This standard was adopted in 1926. This definition may also be secured by referring to page 36 of the Dictionary of Fertilizer Materials and Terms, 1946 ed., published by Ware Brothers Company, Philadelphia, Pennsylvania.

The information set out in the table makes possible the formulation of a number of non-burning fertilizer compositions, each containing the requisite amounts of N, P and K. The ratio of these three elements is calculated as N to $P_2O_5$ to $K_2O$ and any ratio may be formulated as desired. As indicated earlier, 3% or more of each of the three named elements must be present. It is to be noted, however, before the selection of ingredients is made, that one salt, while its saturated aqueous solution vapor pressure is slightly greater than 85% of the vapor pressure of pure water, nevertheless burns plant leaves. The salt is diammonium phosphate. This is due to the fact that its solution gives off free ammonia which produces a severe plasmolysis effect. This particular salt may not therefore be used under any circumstances. The reason for the limitation of the ammoniation of the various superphosphates, as suggested in the table, to 3 or, at the most, 4 pounds ammonia N per unit APA is entirely clear on consideration of the graph appearing on page 566 of the article authored by White, Hardesty and Ross entitled "Ammoniation of double superphosphate," Industrial and Engineering Chemistry, vol. 27, pp. 562–567 (1935), and of the graphs appearing on pages 1380 and 1381 of the article written by Keenen in the Industrial and Engineering Chemistry, vol. 22, pp. 1378–1382 (1930), entitled "Reactions occurring during the ammoniation of superphosphate." As shown in the graphs, the preliminary ammoniation of single and double (triple) superphosphates causes the free phosphoric acid and monocalcium phosphate to be converted to monoammonium phosphate and dicalcium phosphate. These reactions are generally complete when about 2–2½% $NH_3$ has been added to single super and 6–7% to triple super, or the 3 to 4 pounds ammonia N per unit APA level. Additional ammoniation of single superphosphate (containing gypsum, $CaSO_4$) produces ammonium sulfate while triple superphosphate, when so treated, yields diammonium phosphate. Ammonium sulfate appears in the table as a plant leaf burner while it has just been pointed out that diammonium phosphate is the one exception to the 85% rule—due to the tendency of its solution to give off free ammonia. Thus, a somewhat more accurate definition of the maximum ammoniation level for superphosphate is "the point at which ammonium sulfate forms in single superphosphate and diammonium phosphate forms in triple superphosphate." Obviously, however, if only small quantities of a superphosphate are present initially, slight over ammoniation will not produce enough of the harmful ammonium sulfate or diammonium phosphate relative to the quantities of other materials present to do any great damage to the plant leaves. Accordingly, at least 4 pounds or more ammonia nitrogen per unit APA may sometimes be added to a super without harmful effects (see Example V for example) provided not too great a quantity of super is present initially—since substantial and therefore burning quantities of ammonium sulfate or diammonium phosphate are not formed. The quantities of these salts formed under such circumstances are more or less within the ranges observed for impurities which are often found in commercial fertilizer salts. It should further be noted in referring to Table I that ammoniated triple super phosphate, when ammoniated at a rate of 3 lbs. of ammonia per unit APA, causes a slight tip burn. This is true even though its relative humidity equilibrium value at 122° F. is 86.1. Triple super phosphate, as shown in Table I, has a relative humidity equilibrium value of 86.5 at 122° F. and, nevertheless, causes approximately 30% burn. The reason for the difference in these compounds is believed to reside in the presence of free acid in triple super phosphate. When triple super phosphate is nominally ammoniated, as indicated by the results obtained with the triple super phosphate ammoniated to the extent of 3 lbs. per unit APA, the free acid is neutralized. The presence of this free acid is believed to be responsible for the 30% burn present when triple super phosphate is utilized. Ammoniation of triple super phosphate over 3 lbs. per unit APA reduces the relative humidity equilibrium value to an extent that a greater degree of plasmolysis occurs. This decrease is shown by the results set forth in Table I. It should be noted, however, that triple super phosphate ammoniated to different degrees can possibly be used under certain conditions. As stated previously, normally the relative humidity equilibrium values increase as the temperature decreases. Therefore, a salt such as ammoniated triple super phosphate may show good results under mild climatic conditions.

As cost of the ingredients is of primary concern in fertilizer manufacturing operations, the provision of a method whereby non-burning complete goods may be formulated from the least expensive ingredients is of particular significance. Furthermore, in the event that any of the more expensive N, P or K supplying salts become more readily available in the future the invention makes possible an accurate prediction of the suitability of such salts as non-burning fertilizer additives.

At first glance, it would appear that, as the vapor pressure of the mixed fertilizer product rather than that of any individual ingredient ultimately determines whether plasmolysis will occur when such mixed fertilizer is broadcast on growing turf, it should be possible to off-set a rather large vapor pressure lowering effect of a single salt or ingredient by including other ingredients which are known to have little effect on the vapor pressure of water. Unfortunately, however, this is not ordinarily possible. As a general rule, it has been found that the vapor pressure of saturated solutions of mixed salts is as low or lower than that of the individual salt solution having the lowest vapor pressure. And, in the case of salts having a substantial vapor pressure lowering effect, mixing such a salt with another salt markedly lowers the vapor pressure when saturated solutions of the mixture are formed. For an illustration of these principles, attention is directed to the table below showing vapor pressure data on certain individual and mixed salt solutions.

Table II

| Materials | Vapor pressure of saturated aqueous solutions at 86° F., mm. Hg | Percent relative humidity in equilibrium with saturated aqueous solution |
|---|---|---|
| $K_2SO_4$ | 30.68 | 96.3 |
| $KH_2PO_4$ | 29.60 | 92.9 |
| $NH_4H_2PO_4$ | 29.18 | 91.6 |
| $KNO_3$ | 28.84 | 90.5 |
| $KCl$ | 26.75 | 84.0 |
| $(NH_4)_2SO_4$ | 25.22 | 79.2 |
| $CO(NH_2)_2$ | 23.09 | 72.5 |
| $NH_4NO_3$ | 18.93 | 59.4 |
| $KH_2PO_4+K_2SO_4$ | 29.86 | 93.8 |
| $NH_4H_2PO_4+KH_2PO_4$ | 28.99 | 91. |
| $KNO_3+KH_2PO_4$ | 28.71 | 90.1 |
| $(NH_4)_2SO_4+K_2SO_4$ | 25.92 | 81.4 |
| $CO(NH_2)_2+(NH_4)_2SO_4$ | 17.95 | 56.4 |
| $NH_4NO_3+(NH_4)_2SO_4$ | 19.82 | 62.3 |
| $KCl+CO(NH_2)_2$ | 19.20 | 60.3 |
| $NH_4NO_3+CO(NH_2)_2$ | 5.75 | 18.1 |

For example, note that when $KH_2PO_4$ and $KNO_3$ having saturated solution vapor pressures of 92.9 and 90.5 percent respectively of the pressure of pure water are mixed, the solution pressure drops to 90.1%, slightly below that of $KNO_3$. This combined lowering effect becomes more pronounced as salts listed farther down in the table are selected until, on mixing $NH_4NO_3$ and $CO(NH_2)_2$, the saturated solution pressure drops to 18.1% of that of pure water, a very significant drop from the pressure lowering caused by either of the constituents singly.

It should be noted that the values set forth in Table II above were measured at 86° F. and not at 122° F. as shown in Table I and the examples which follow. The purpose of Table II is merely to demonstrate the relatively unpredictable effect on the relative humidity equilibrium values experienced when mixtures of the salts are made. These unpredictable effects can be expected to occur with relation to values measured at 122° F. or any other temperature.

Examples of fertilizer compositions exhibiting the desired non-burning properties, formulated on a 6-10-4 ratio of N to $P_2O_5$ to $K_2O$ and having N, $P_2O_5$ and $K_2O$ levels of over 3% each are set forth below:

EXAMPLE I

| Ingredients in composition | Analysis of ingredient | Lbs./ton | V. P. mm. Hg at 50° C. | Equil. R. H., percent | Burn effect on grass |
|---|---|---|---|---|---|
| Single super | 20% APA | 1,000 | | | |
| Anhy. $NH_3$ | 82% N | 31 | 83.8 | 90.5 | |
| $K_2SO_4$ | 50% $K_2O$ | 160 | | | |
| Urea-formaldehyde condensation product | 38% N | 250 | | | |
| Dolomite | | 559 | | | No burn. |
| | | 2,000 | | | |

EXAMPLE II

| | | | | | |
|---|---|---|---|---|---|
| Ammoniated S. super | (1.94-17.2-0) | 1,160 | | | |
| $KNO_3$ | (13-0-44) | 182 | | | |
| Urea-formaldehyde condensation product | 38.5% | 192 | 80.1 | 86.6 | Slight tip burn. |
| Dolomite | | 466 | | | |
| | | 2,000 | | | |

EXAMPLE III

| | | | | | |
|---|---|---|---|---|---|
| Triple super | 42.9% | 318 | | | |
| Anhy. $NH_3$ | 82% N | 61 | | | |
| $K_2SO_4$ | 53.2% $K_2O$ | 151 | 84.8 | 91.6 | No burn. |
| Activated sludge | (5.5-5-0) | 1,275 | | | |
| Dolomite | | 175 | | | |
| Nel (minor element base) | | 20 | | | |
| | | 2,000 | | | |

EXAMPLE IV

| | | | | | |
|---|---|---|---|---|---|
| Single super | 19% APA | 1,050 | | | |
| Anhy. $NH_3$ (3 lbs. N/unit APA) | | 36.4 | | | |
| $K_2SO_4$ | 53.2% $K_2O$ | 150 | 79.7 | 86.1 | No burn. |
| Urea | 47.7% N | 189 | | | |
| Formaldehyde | (40% $CH_2O$) | 118 | | | |
| Coloring matter | | .2 | | | |
| Dolomite | | 532 | | | |
| | | 2,094.6 | | | |

EXAMPLE V

| | | | | | |
|---|---|---|---|---|---|
| Single super | 19% APA | 920 | | | |
| Activated sludge | 4.8-4.5-0 | 590 | | | |
| $K_2SO_4$ | 53.2% $K_2O$ | 150 | | | |
| Urea | 47.7% N | 120 | | | |
| Anhy. $NH_3$ (4 lbs. N/unit APA) | | 42 | 82.3 | 88.8 | No burn. |
| Formaldehyde | 40% $CH_2O$ | 75 | | | |
| Nel | | 20 | | | |
| Coloring matter | | 0.8 | | | |
| Dolomite | | 133.0 | | | |
| | | 2,053.8 | | | |

In the above examples, APA is commonly used in the fertilizer industry to indicate the available phosphoric acid content of any one compound. By phosphoric acid in the trade, it is meant $P_2O_5$ which is phophorus pentoxide. The Nel referred to pertains to a mixture of minor element salts such as copper sulfate, borax, zinc sulphate, etc.

Similar to most presently used fertilizer compositions, the above formulations contain significant quantities of dolomite. Its purpose is to provide a neutralizing action in the soil as other portions of the mixture break down to acidic residues and also to furnish calcium and magnesium to the growing plant. The anhydrous ammonia used in several of the formulations reacts with the free acid and the monocalcium phosphate in the super phosphates to form monoammonium phosphate and dicalcium phosphate. Reference to Table I above shows that each of these salts is non-burning.

It is within the scope of this invention to employ additional filler materials. Also, as indicated in the examples, a portion of the nitrogen requirements may be supplied by certain organic materials. For example, sludge, seed meals or tankages may be used.

It is to be noted that while ingredients having a solution vapor pressure of above 85% of that of pure water are preferred, it is possible, under certain circumstances to prepare a complete mixed goods formulation which, in a saturated aqueous solution, produces a vapor pressure of around 85% of that of pure water and fails to "burn" turf. As stated above, this is due to the fact that the burning effect is related to the ambient temperature conditions. Thus, on bright sunny days in midsummer where the temperature reaches 90–100° F., turf will begin to show evidence of burning when a saturated aqueous solution of the formulation under consideration displays a vapor pressure no less than 87% of that of pure water. However, on cool (60–80° F.) cloudy fall days, a vapor pressure value of around 85% can be tolerated. However, it should be noted that improper use of a fertilizer correctly formulated in accordance with the teachings of the present invention may result in "burn." For example, if the fertilizer is deposited in too great a quantity on any single plant area, a "burn" may result. Smothering of the plant's stolons and the toxicity effects from the presence of excess ions of $NH_4^+$, $SO_4^-$, $Cl^-$, $K^+$, $Na^+$, etc. within the plant cell solution will cause browning.

While reference is made to 6-10-4 ratios, it should be understood that any suitable ratios can be formulated.

The term "ammoniated superphosphate" as used in the claims is intended to mean either ammoniated single or ammoniated triple superphosphate. Furthermore, the terms "double superphosphate" and "triple superphosphate" refer to the same product and are used interchangeably.

Obviously, many modifications and variations of the invention as hereinbefore set forth may be made without departing from the spirit and scope thereof, and therefore only such limitations should be imposed as are indicated in the appended claims.

We claim:

1. The method of preparing a substantially dry, non-burning fixed fertilizer containing ingredients supplying nitrogen, phosphorous, and potassium in available form which comprises: predetermining the vapor pressure of saturated water solutions of said ingredients; mixing those ingredients having at least about 85 percent of the vapor pressure of pure water when measured at the same temperature in such proportions that the N, P, and K content expressed as N, $P_2O_5$, and $K_2O$ based on the total weight of the mixed fertilizer is at least about 3 percent each to provide a complete plant food showing substantially no burning when applied to leafy plants in amounts normally used for plant food purposes.

2. The method as in claim 1 wherein the nitrogen supplying ingredient is a urea-formaldehyde condensation product.

3. The method as in claim 1 wherein the phosphorous supplying ingredient is ammoniated superphosphate having an ammonia content sufficiently low to avoid the formation of burning quantities of a member selected from the group consisting of ammonium sulfate and diammonium phosphate and mixtures thereof in said superphosphate.

4. The method as in claim 1 wherein the phosphorous supplying ingredient is dicalcium phosphate.

5. The method as in claim 1 wherein the potassium supplying ingredient is potassium sulphate.

6. The method as in claim 1 wherein the potassium supplying ingredient is potassium nitrate.

7. A substantially dry, non-burning fertilizer composition comprising a member selected from the group consisting of urea-formaldehyde condensation products, single superphosphate, and an ammoniated superphosphate having an ammonia content sufficient to neutralize substantially all free phosphoric acid and sufficiently low to avoid the formation of burning quantities of a member selected from the group consisting of ammonium sulfate and diammonium phosphate and mixtures thereof in said ammoniated superphosphate, and mixtures thereof; and additional fertilizer material substantially free from diammonium phosphate and unammoniated triple superphosphate having the ability when in a saturated aqueous solution to maintain the vapor pressure of said solution at a level of at least about 85% of the vapor pressure of pure water when both of said vapor pressures are measured at the same temperature, said additional material being of such a composition as to supply at least one element of the group consisting of nitrogen, phosphorous, and potassium, the ingredients of said composition being in such amount and in such proportion as to supply each of the elements nitrogen, phosphorous, and potassium in their available form and in quantities of at least about 3% of each of the elements nitrogen, phosphorous, and potassium calculated as N, $P_2O_5$, and $K_2O$ based on the total weight of said composition, said composition when in a saturated aqueous solution having the ability to maintain the vapor pressure of said solution at a level of at least about 85% of the vapor pressure of pure water when both of said vapor pressures are measured at the same temperature.

8. A substantially dry, non-burning fertilizer composition comprising a member selected from the group consisting of urea-formaldehyde condensation products, single superphosphate, and an ammoniated superphosphate having an ammonia content sufficient to neutralize substantially all free phosphoric acid and sufficiently low to avoid the formation of burning quantities of a member selected from the group consisting of ammonium sulfate and diammonium phosphate and mixtures thereof in said ammoniated superphosphate, and mixtures thereof; and additional fertilizer material substantially free from diammonium phosphate and unammoniated triple superphosphate, said composition containing nitrogen, phosphorous, and potassium in their available form, said additional fertilizer material being selected from the group consisting of magnesium ammonium phosphate, potassium sulfate, monocalcium phosphate, dicalcium phosphate, tankage, vegetable seed meals, monoammonium phosphate, potassium nitrate, monopotassium phosphate, activated sludge, and mixtures thereof; the ingredients of said composition being in such amount and in such proportion as to supply each of the elements nitrogen phosphorous, and potassium in their available form and in quantities of at least about 3% of each of the elements nitrogen, phosphorous, and potassium calculated as N, $P_2O_5$, and $K_2O$ based on the total weight of said composition, said composition when in a saturated aqueous solution having the ability to maintain the vapor pressure of said solution at a level of at least about 85% of the vapor pressure of pure water when both of said vapor pressures are measured at the same temperature.

9. A substantially dry, non-burning fertilizer composition comprising urea-formaldehyde condensation products and additional fertilizer material substantially free from diammonium phosphate and unammoniated triple superphosphate, said additional material being selected from the group consisting of magnesium ammonium phosphate, potassium sulfate, monocalcium phosphate, dicalcium phosphate, tankage, vegetable seed meals, monoammonium phosphate, potassium nitrate, monopotassium phosphate, activated sludge, and mixtures thereof; the ingredients of said composition being in such amount and in such proportion as to supply each of the elements nitrogen, phosphorous, and potassium in their available form and in quantities of at least about 3% of each of the elements nitrogen, phosphorous, and potassium calculated as N, $P_2O_5$, and $K_2O$ based upon the total weight of said composition, said composition when in a saturated aqueous solution having the ability to maintain the vapor pressure of said solution at a level of at least about 85% of the vapor pressure of pure water when both of said vapor pressures are measured at the same temperature.

10. A substantially dry, non-burning fertilizer composition comprising single superphosphate and additional fertilizer material substantially free from diammonium phosphate and unammoniated triple superphosphate, said additional material being selected from the group consisting of magnesium ammonium phosphate, potassium sulfate, monocalcium phosphate, dicalcium phosphate, tankage, vegetable seed meals, monoammonium phosphate, potassium nitrate, monopotassium phosphate, activated sludge, and mixtures thereof; the ingredients of said composition being in such amount and in such proportion as to supply each of the elements nitrogen, phosphorous, and potassium in their available form and in quantities of at least about 3% of each of the elements nitrogen, phosphorous, and potassium calculated as N, $P_2O_5$, and $K_2O$ based upon the total weight of the composition, said composition when in a saturated aqueous solution having the ability to maintain the vapor pressure of said solution at a level of at least about 85% of the vapor pressure of pure water when both of said vapor pressures are measured at the same temperature.

11. A substantially dry, non-burning fertilizer composition comprising an ammoniated superphosphate having an ammonia content sufficient to neutralize substantially all free phosphoric acid and sufficiently low to avoid the formation of burning quantities of a member selected from the group consisting of ammonium sulfate and diammonium phosphate and mixtures thereof in said ammoniated superphosphate; and additional fertilizer material substantially free from diammonium phosphate and unammoniated triple superphosphate, said additional material being selected from the group consisting of magnesium ammonium phosphate, potassium sulfate, monocalcium phosphate, dicalcium phosphate, tankage, vegetable seed meals, monoammonium phosphate, potassium nitrate, monopotassium phosphate, activated sludge, and mixtures thereof; the ingredients of said composition being in such amount and in such proportion as to supply each of the elements nitrogen, phosphorous, and potassium in their available form and in quantities of at least about 3% of each of the elements nitrogen, phosphorous, and potassium calculated as N, $P_2O_5$, and $K_2O$ based upon the total weight of said composition, said composition when in a saturated aqueous solution having the ability to maintain the vapor pressure of said solution at a level of at least about 85% of the vapor pressure of pure water when both of said vapor pressures are measured at the same temperature.

12. A substantially dry, non-burning fertilizer composition comprising urea-formaldehyde condensation products, mono-ammonium phosphate and potassium sulfate, said composition being substantially free from diammonium phosphate and unammoniated triple superphosphate, the ingredients of said composition being in such amount and in such proportion as to supply each of the elements nitrogen, phosphorous, and potassium in their available form and in quantities of at least about 3% of each of the elements nitrogen, phosphorous, and potassium calculated as N, $P_2O_5$, and $K_2O$ based upon the total weight of the composition, said composition when in a saturated aqueous solution having the ability to maintain the vapor pressure of said solution at a level of at least about 85% of the vapor pressure of pure water when both of said vapor pressures are measured at the same temperature.

13. A substantially dry, non-burning fertilizer composition comprising urea-formaldehyde condensation products, mono-ammonium phosphate and potassium nitrate, said composition being substantially free from diammonium phosphate and unammoniated triple superphosphate, the ingredients of said composition being in such amount and in such proportion as to supply each of the elements nitrogen, phosphorous, and potassium in their available form and in quantities of at least about 3% of each of the elements nitrogen, phosphorous, and potassium calculated as N, $P_2O_5$, and $K_2O$ based upon the total weight of the composition, said composition when in a saturated aqueous solution having the ability to maintain the vapor pressure of said solution at a level of at least about 85% of the vapor pressure of pure water when both of said vapor pressures are measured at the same temperature.

14. A substantially dry, non-burning fertilizer composition comprising ammoniated superphosphate having an ammonia content sufficient to neutralize substantially all free phosphoric acid and sufficiently low to avoid the formation of burning quantities of a member selected from the group consisting of ammonium sulfate and diammonium phosphate and mixtures thereof in said ammoniated superphosphate, potassium sulfate, and urea-formaldehyde condensation products, said composition being substantially free from diammonium phosphate and unammoniated triple superphosphate, the ingredients of said composition being in such amount and in such proportion as to supply each of the elements nitrogen, phosphorous, and potassium in their available form and in quantities of at least about 3% of each of the elements nitrogen, phosphorous, and potassium calculated as N, $P_2O_5$, and $K_2O$ based upon the total weight of the composition, said composition when in a saturated aqueous solution having the ability to maintain the vapor pressure of said solution at a level of at least about 85% of the vapor pressure of pure water when both of said vapor pressures are measured at the same temperature.

15. A fertilizer composition in accordance with claim 14 wherein the ammoniated superphosphate is approximately 50%, the potassium sulfate approximately 7½%, the urea-formaldehyde condensation product approximately 12% of the total weight of the composition.

16. A substantially dry, non-burning fertilizer composition comprising ammoniated superphosphate having an ammonia content sufficient to neutralize substantially all free phosphoric acid and sufficiently low to avoid the formation of burning quantities of a member selected from the group consisting of ammonium sulfate and diammonium phosphate and mixtures thereof in said ammoniated superphosphate, potassium nitrate, and urea-formaldehyde condensation products, said composition being substantially free from diammonium phosphate and unammoniated triple superphosphate, the ingredients of said composition being in such amount and in such proportion as to supply each of the elements nitrogen, phosphorous, and potassium in their available form and in quantities of at least about 3% of each of the elements nitrogen, phosphorous, and potassium calculated as N, $P_2O_5$, and $K_2O$ based upon the total weight of the composition, said composition when in a saturated aqueous solution having the ability to maintain the vapor pressure of said solution at a level of at least about 85% of the vapor pressure of pure water when both of said vapor pressures are measured at the same temperature.

17. A fertilizer composition in accordance with claim 16 wherein the ammoniated superphosphate is approximately 50%, the potassium nitrate approximately 9% and the urea-formaldehyde condensation product approximately 9½% of the total weight of the composition.

References Cited in the file of this patent

UNITED STATES PATENTS

| | | |
|---|---|---|
| 1,191,615 | Ross | July 18, 1916 |
| 1,284,441 | Phillips | Nov. 12, 1918 |
| 1,320,701 | Manns | Nov. 4, 1919 |
| 1,354,719 | Bohre | Oct. 5, 1920 |
| 1,552,732 | Reich | Sept. 8, 1925 |
| 1,699,254 | Schwarz | Jan. 15, 1929 |
| 2,022,676 | Kniskern | Dec. 3, 1935 |
| 2,036,870 | Harvey | Apr. 7, 1936 |
| 2,102,831 | Brill | Dec. 21, 1937 |
| 2,255,027 | Keenen | Sept. 2, 1941 |
| 2,415,705 | Rohner et al. | Feb. 11, 1947 |
| 2,618,546 | Davenport | Nov. 18, 1952 |

OTHER REFERENCES

Industrial and Engineering Chemistry, vol. 21, January–June 1929, pages 305–307.

Annual Report, New Jersey Station, July 1928 to June 1929, page 325.

Industrial and Engineering Chemistry, "New Synthetic Nitrogen Fertilizer," Clark et al., July 1948.

U. S. DEPARTMENT OF COMMERCE
PATENT OFFICE

CERTIFICATE OF CORRECTION

Patent No. 2,827,368                                    March 18, 1958

Everett N. Mortenson et al.

It is hereby certified that error appears in the printed specification of the above numbered patent requiring correction and that the said Letters Patent should read as corrected below.

Column 9, line 23, for "fixed fertilizer" read -- mixed fertilizer --.

Signed and sealed this 22nd day of April 1958.

(SEAL)
Attest:

KARL H. AXLINE
Attesting Officer

ROBERT C. WATSON
Commissioner of Patents